United States Patent
Zhao et al.

(10) Patent No.: US 9,265,003 B2
(45) Date of Patent: Feb. 16, 2016

(54) APPARATUS AND METHODS FOR REDUCING POWER CONSUMPTION AND/OR RADIO FREQUENCY INTERFERENCE IN A MOBILE COMPUTING DEVICE

(75) Inventors: Wen Zhao, Cupertino, CA (US); Isabel Mahe, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1939 days.

(21) Appl. No.: 11/559,018

(22) Filed: Nov. 13, 2006

(65) Prior Publication Data

US 2008/0113692 A1    May 15, 2008

(51) Int. Cl.
*H04W 52/02* (2009.01)
*H04B 15/02* (2006.01)
*H04W 88/06* (2009.01)

(52) U.S. Cl.
CPC ........... *H04W 52/0274* (2013.01); *H04B 15/02* (2013.01); *H04W 52/0229* (2013.01); *H04B 2215/068* (2013.01); *H04M 2250/06* (2013.01); *H04W 88/06* (2013.01); *Y02B 60/50* (2013.01)

(58) Field of Classification Search
CPC . H04L 65/1016; H04L 65/4084; H04L 12/66; H04L 65/4076; H04L 45/16; H04L 12/189; H04L 12/2861; H04L 65/103; H04L 67/04; H04L 67/327; H04W 76/005; H04W 80/00; H04W 84/12; H04W 36/08; H04W 88/16; H04W 76/002; H04W 84/045; H04W 88/182; H04W 92/045; H04W 92/20; H04N 21/6405; H04N 21/2365; H04N 21/43615; H04N 21/6131; H04N 21/6338; H04Q 2213/13389; H04M 1/7253; H04H 20/42

USPC ............... 455/445, 553.1, 574; 370/331, 328, 370/329; 713/168
See application file for complete search history.

(56) References Cited

U.S. PATENT DOCUMENTS

| | | | |
|---|---|---|---|
| 7,254,119 B2* | 8/2007 | Jiang et al. | 370/328 |
| 2002/0085516 A1 | 7/2002 | Bridgelall | |
| 2002/0137472 A1* | 9/2002 | Quinn et al. | 455/90 |
| 2005/0286476 A1 | 12/2005 | Crosswy et al. | |
| 2006/0059341 A1* | 3/2006 | Dharmadhikari et al. | 713/168 |
| 2008/0102843 A1* | 5/2008 | Todd et al. | 455/445 |
| 2008/0133614 A1 | 6/2008 | Scott | |

FOREIGN PATENT DOCUMENTS

| | | |
|---|---|---|
| GB | 2 395 635 A | 5/2004 |
| WO | 2008063993 A1 | 5/2008 |

OTHER PUBLICATIONS

Extended European Search Report, European Application No. 07884320.2, Date: May 3, 2012, pp. 1-6.

* cited by examiner

*Primary Examiner* — Nizar Sivji
(74) *Attorney, Agent, or Firm* — Norton Rose Fulbright US LLP

(57) ABSTRACT

Various embodiments for reducing power consumption and radio frequency (RF) interference in a mobile computing device are described. In one or more embodiments, the mobile computing device may support cellular voice communication, wireless wide area network (WWAN) data communication, and wireless local area network (WLAN) data communication. The mobile computing device may be arranged to disable WWAN data communication whenever an available WLAN is detected to reduce RF interference and/or power consumption. Other embodiments are described and claimed.

20 Claims, 2 Drawing Sheets

APPARATUS AND METHODS FOR REDUCING POWER CONSUMPTION AND/OR RADIO FREQUENCY INTERFERENCE IN A MOBILE COMPUTING DEVICE

BACKGROUND

A mobile computing device such as a combination handheld computer and mobile telephone or smart phone generally may provide voice and data communications functionality, as well as computing and processing capabilities. In some cases, a smart phone may be implemented as an Unlicensed Mobile Access (UMA) or dual-mode mobile computing device to support both cellular communication over a Code Division Multiple Access (CDMA) cellular network as well as Wireless Fidelity (WiFi) communication over an 802.11 wireless network. In addition, a CDMA mobile computing device may support Evolution-Data Optimized (EV-DO) data communication over a wireless radio channel.

Typically, multiple modes of a mobile computing device are supported at the same time which often may result in radio frequency (RF) interference and excessive power consumption especially when operating from a battery. Accordingly, there exists the need for an improved apparatus and methods for reducing power consumption and RF interference in a mobile computing device.

DETAILED DESCRIPTION

Various embodiments are directed to reducing power consumption and RF interference in a mobile computing device. In one or more embodiments, the mobile computing device may be arranged to support cellular voice communication, wireless wide area network (WWAN) data communication, and wireless local area network (WLAN) data communication. For example, the mobile computing device may be implemented as UMA or dual-mode wireless device supporting CDMA voice communication, EV-DO data communication, and WiFi data communication. In various implementations, the mobile computing device may be arranged to disable WWAN data communication whenever an available WLAN is detected to reduce power consumption and RF interference.

Figure 1:
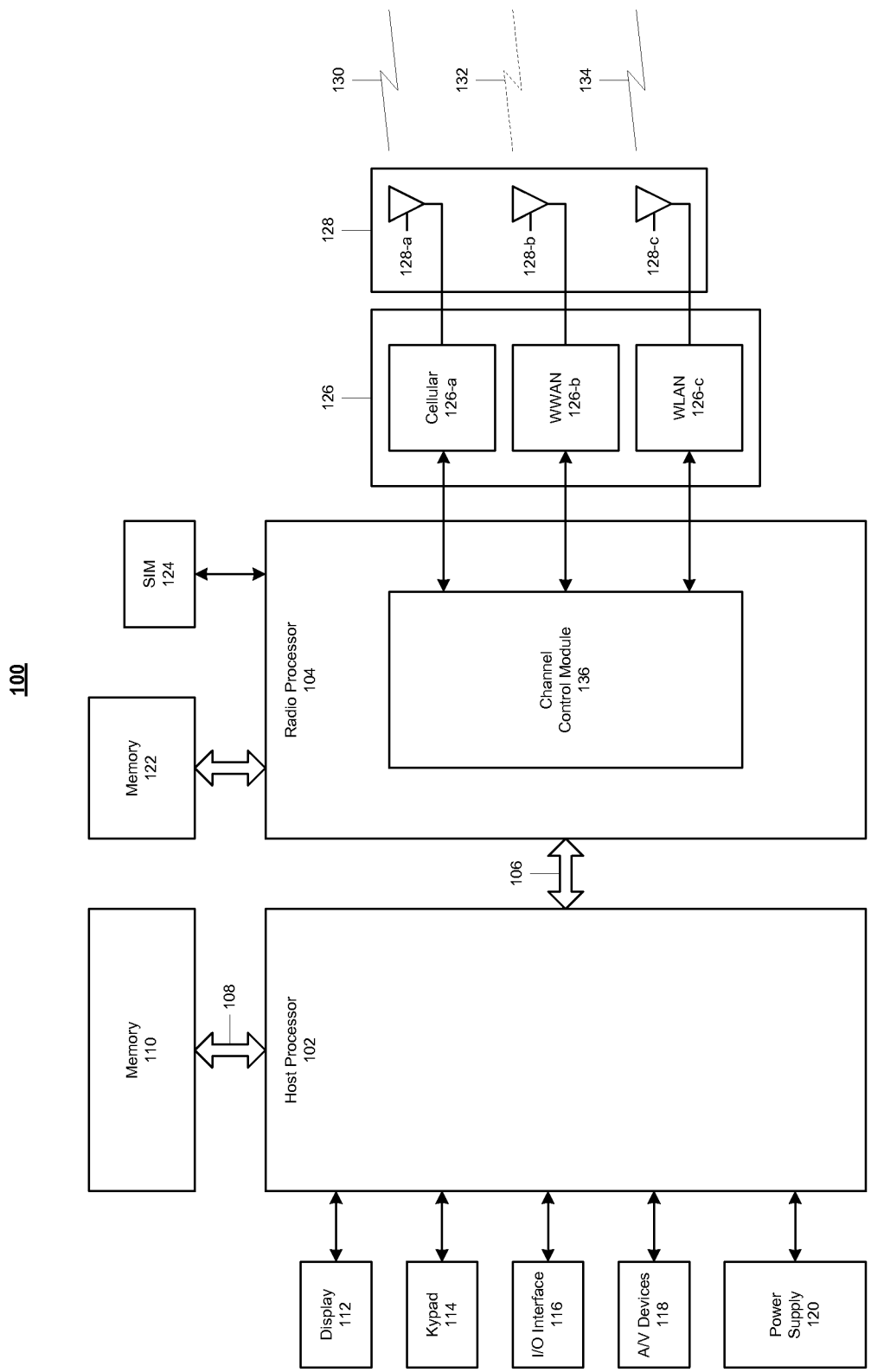
FIG. 1 illustrates a mobile computing device in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include CDMA systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide WWAN data communications functionality in accordance with different types of cellular radiotelephone systems. Examples of cellular radiotelephone systems offering WWAN data communications services may include EV-DO systems, Evolution For Data and Voice (EV-DV) systems, CDMA/1xRTT systems, GSM with General Packet Radio Service (GPRS) systems (GSM/GPRS), Enhanced Data Rates for Global Evolution (EDGE) systems, High Speed Downlink Packet Access (HSDPA) systems, High Speed Uplink Packet Access (HSUPA), and so forth.

The mobile computing device 100 may be arranged to provide data communications functionality in accordance with different types of WLAN systems. Examples of suitable WLAN systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 1, the mobile computing device 100 may comprise a dual-processor architecture including a host processor 102 and a radio processor 104. The host processor 102 may be arranged to provide processing or computing resources to the mobile computing device 100. The radio processor 104 may be responsible for performing various voice and data communications operations for the mobile computing device 100 such as transmitting and receiving voice and data information over one or more wireless communications channels. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Although some embodiments may be described as comprising a dual-processor architecture for purposes of illustration, it is worthy to note that the mobile computing device 100 may comprise any suitable processor architecture and/or any suitable number of processors consistent with the described embodiments.

The host processor 102 may be responsible for executing various software programs such as system programs and application programs to provide computing and processing operations for the mobile computing device 1 00. System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), web browser applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 1 10. The memory bus 108 may comprise any suitable interface and/or bus architecture for allowing the host processor 102 to access the memory 1 10. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise a display 112 coupled to the host processor 102. The display 112 may comprise any suitable visual interface for displaying content to a user of the mobile computing device 100. In one embodiment, for example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an alphanumeric keypad 114 coupled to the host processor 102. The keypad 114 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a subscriber identity module (SIM) 124 coupled to the radio processor 104. The SIM 124 may comprise, for example, a removable or non-removable smart card arranged to encrypt voice and data transmissions and to store user-specific data for allowing a voice or data communications network to identify and authenticate the user. The SIM 124 also may store data such as personal settings specific to the user.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

As shown in FIG. 1, the mobile computing device 100 may comprise a transceiver module 126 coupled to the radio processor 104. The transceiver module 126 may comprise one or more transceivers or components arranged to communicate using different types of protocols, communication ranges, operating power requirements, RF sub-bands, information types (e.g., voice or data), use scenarios, applications, and so forth. In some implementations, the transceiver module 126 may comprise a Global Positioning System (GPS) transceiver to support position determination and/or location-based services.

The transceiver module 126 generally may be implemented using one or more chips as desired for a given implementation. Although the transceiver module 126 may be shown as being separate from and external to the radio processor 104 for purposes of illustration, it is worthy to note that in various embodiments some portion or the entire transceiver module 126 may be included on the same integrated circuit as the radio processor 104. The embodiments are not limited in this context.

The mobile computing device 100 may comprise an antenna system 128 for transmitting and/or receiving electrical signals. As shown, the antenna system 128 may be coupled to the radio processor 104 through the transceiver module 126. The antenna system 128 may comprise or be implemented as one or more internal antennas and/or external antennas.

In various embodiments, the mobile computing device 100 may be arranged to support cellular voice communication, WWAN data communication, and WLAN data communication. For example, the mobile computing device 100 may be implemented as UMA or dual-mode wireless device supporting CDMA voice communication, EV-DO data communication, and WiFi data communication. The embodiments, however, are not limited in this context.

The transceiver module 126 may comprise one or more cellular transceivers or components 126-a arranged to support communication over a cellular voice channel 130 for a system such as a CDMA, GSM, and/or UMTS cellular system. In some implementations, the cellular transceiver or components 126-a may be coupled to a corresponding cellular antenna 128-a.

The transceiver module 126 also may comprise one or more WWAN transceivers or components 126-b arranged to support data communication over a WWAN data channel 132 in accordance with one or more WWAN protocols such as EV-DO protocols, EVDV protocols, CDMA/1xRTT protocols, GSM/GPRS protocols, EDGE protocols, HSDPA protocols, and so forth. In some implementations, the WWAN transceiver or components 126-b may be coupled to a corresponding WWAN antenna 128-b.

The transceiver module 126 also may comprise one or more transceivers or components 126-c arranged to support data communication over a WLAN data channel 134 in accordance with one or more WLAN protocols such as IEEE 802.11a/b/g/n protocols, IEEE 802.16 protocols, IEEE 802.20 protocols, PAN protocols, Infrared protocols, Bluetooth protocols, EMI protocols including passive or active RFID protocols, and so forth.

The mobile computing device 100 may comprise a channel control module 136. In various embodiments, the channel control module 136 may be arranged to manually and/or automatically detect an available WLAN. The channel control module 136 may be arranged to periodically or continuously check for the presence of an available WLAN. In some cases, the channel control module 136 may be arranged to automatically connect to an available and/or preferred WLAN, such as a home or office WLAN of the user. In other cases, the channel control module 136 may require the user to authorize the connection to an available WLAN. If the WLAN is a secure network, the channel control module 136 may be arranged to prompt the user for and/or supply the appropriate key or password needed to establish a connection.

The channel control module 136 may be arranged to hand-off or switch communications among the cellular voice channel 130, the WWAN communication channel 132, and the WLAN data channel 134. For example, when the mobile computing device 100 enters a WLAN, the channel control module 136 may be arranged to handoff or switch a voice call on the cellular voice channel 130 to a Voice over IP (VOIP) call on the WLAN data channel 134. The channel control module 136 also may be arranged to handoff or switch a data call on the WWAN data channel 132 to the WLAN data channel 134 automatically (e.g., by default) or when WLAN communication is determined to be faster and/or more cost-effective.

The channel control module 136 may be arranged to monitor WLAN communication and to handoff or switch communication from the WLAN data channel 134 to the cellular voice channel 130 and/or the WWAN data channel 132 if WLAN communication is lost and/or if the WLAN signal strength falls below a certain threshold level. For example, the channel control module 136 may be arranged to handoff or switch WiFi data communication to EV-DO data communication if the WiFi connection is lost, deteriorates, and/or falls below a certain signal strength.

In various embodiments, the mobile computing device 100 may be arranged to disable WWAN data communication whenever an available WLAN is detected. For example, EV-DO data communication may be disabled whenever WiFi data communication is possible over an available WLAN. Disabling WWAN data communication may reduce RF interference between the WWAN channel 132 and the WLAN data channel 134 resulting in improved data communication. Disabling WWAN data communication also may significantly reduce power consumption of the mobile computing device 100 by conserving the power supply 120 (e.g., battery). In various embodiments, for example, disabling WWAN communication may comprise turning off power to the WWAN transceiver or components 126-b whenever an available WLAN is detected.

Disabling WWAN communication may comprise suspending the monitoring for incoming data calls on the WWAN data channel 132 when the mobile computing device 100 is in an idle state. For example, the mobile computing device 100 may enter an idle state when no voice or data calls are in progress and/or after a certain period of no voice or data activity. Upon making or detecting a voice or data call, the mobile computing device 100 may exit the idle state.

In the idle state, the mobile computing device 100 may maintain and actively listen to the cellular voice channel 130 for incoming voice calls. In the idle state, the mobile computing device 100 also may maintain and actively listen to the WWAN data channel 132 for incoming data calls or IP packets. By suspending the monitoring for incoming data calls on the WWAN data channel 132 when the mobile computing device 100 is in an idle state, the amount of power required for idle state operation is decreased.

Disabling WWAN communication may comprise modifying a sleep cycle with respect to the WWAN data channel 132 to prevent the mobile computing device 100 from waking up. For example, in the cellular voice channel 130 (e.g., CDMA voice channel) and the WWAN data channel 132 (e.g., EV-DO data channel), time may be divided into slots (e.g., 80 millisecond time slots) within a slot cycle ranging from 16 time slots (e.g., 1.28 seconds) to 2048 time slots (e.g., 163.84 seconds). To conserve more power in the idle state, especially when operating from a battery, the mobile computing device 100 may implement a sleep cycle with respect to the cellular voice channel 130 and the WWAN data channel 132. In the sleep cycle, the mobile computing device 100 may be arranged to wake up and listen for incoming voice calls and data calls only during assigned time slots instead of continuously monitoring all time slots in all channels. When the mobile computing device 100 is not monitoring the assigned slots (sleeping), power to the cellular transceiver or components 126-a and to the WWAN transceiver or components 126-b may be turned off to conserve power.

The mobile computing device 100 may include slot cycle index (SCI) settings to control the sleep cycle and how often the mobile computing device 100 wakes up and listens to the cellular voice channel 130 for voice calls and to the WWAN data channel 132 for data calls. For example, a mobile computing device 100 with an SCI set to '0' may wake up every 1.28 seconds, an SCI set to '1' every 2.56 seconds, an SCI set to '2' every 5.12 seconds, and so on. By default, the SCI may be set to '2' for the cellular voice channel 130 and for the WWAN data channel 132, requiring the mobile computing device 100 to wake up and check for voice calls and data calls and voice calls every 5.12 seconds. The SCI settings may be configured so that the mobile computing device 100 wakes up and checks for voice calls and data calls at the same time or interleaves checking for voice calls and data calls.

In some implementations, the SCI setting for data calls may be different (e.g., shorter) than for voice calls. While a larger SCI setting conserves more power, the resulting overhead or delay to receive and respond to incoming calls may adversely impact the performance of time critical applications. For example, to support applications that require very fast, real-time communications such as interactive gaming applications and push-to-talk messaging applications, the mobile computing device 100 may require an SCI set to '0' (e.g., 1.28 seconds) or even a reduced or negative slot cycle mode.

While implementing a sleep cycle does conserve power, the periodic monitoring of the WWAN data channel 132 is still a significant drain on the power supply 120 (e.g., battery) especially in a reduced or negative slot cycle mode. Accordingly, significant power savings may be achieved by disabling WWAN communication when an available WLAN is detected and preventing the mobile computing device 100 from periodically waking up to monitor the WWAN data channel 132.

In various embodiments, the mobile computing device 100 may be arranged to monitor for incoming data calls on the WWAN data channel 132 only if an available WLAN is not detected. For example, while data communication over the WLAN channel is being carried out, the mobile computing device 100 will not monitor the WWAN data channel 132 for incoming data calls. Additionally, when in an idle state, the mobile computing device 100 will not monitor the WWAN data channel 132 for incoming calls either continuously or periodically according to a sleep cycle whenever an available WLAN is detected and data communication over the WLAN data channel 134 is possible.

If WLAN communication is unavailable, lost, and/or deteriorates below a certain threshold level (e.g., signal strength), the mobile computing device 100 may be arranged to enable and/or to reestablish WWAN data communication. For example, the channel control module 136 monitor WLAN communication and establish or bring up the WLAN data channel 134 if WLAN communication is lost and/or if the WLAN signal strength falls below a certain threshold level. The channel control module 136 may handoff or switch data communication from the WLAN data channel 134 to the WWAN data channel 132. For example, EV-DO data communication may be established and WiFi data communication may be switched to EV-DO data communication if the WiFi connection is lost, deteriorates, and/or falls below a certain signal strength.

Figure 2:
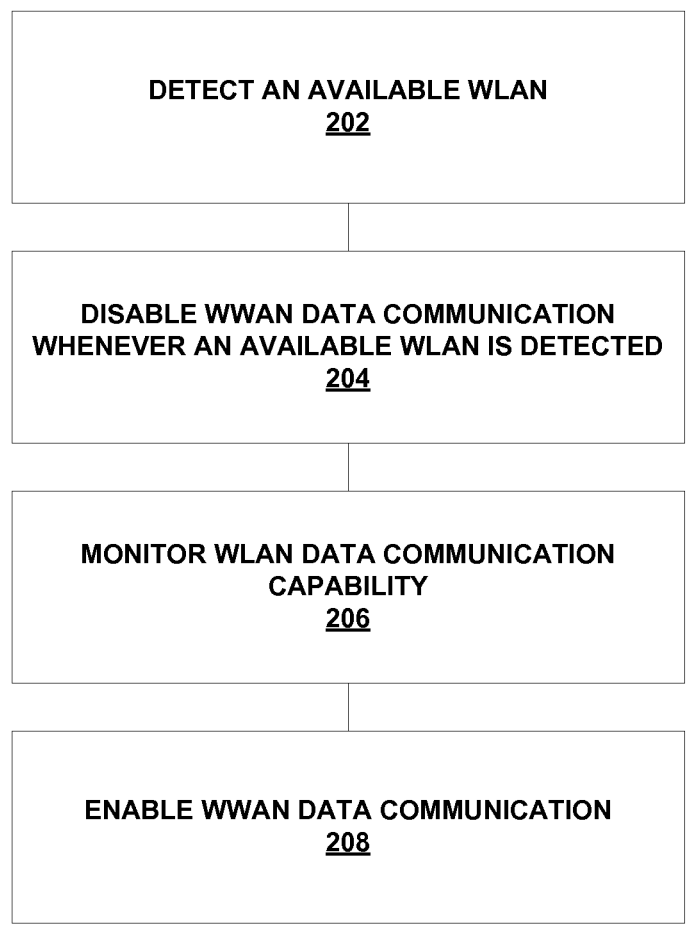
FIG. 2 illustrates a logic flow in accordance with one or more embodiments.

FIG. 2 illustrates a logic flow 200 in accordance with one or more embodiments. The logic flow 200 may be performed by various systems and/or devices and may be implemented as hardware, software, and/or any combination thereof, as desired for a given set of design parameters or performance constraints. For example, the logic flow 200 may be implemented by a logic device (e.g., processor) and/or logic (e.g., instructions, data, and/or code) to be executed by a logic device. For purposes of illustration, and not limitation, the logic flow 200 is described with reference to FIG. 1. The embodiments are not limited in this context.

The logic flow 200 may comprise detecting an available WLAN (block 202). In various embodiments, the available WLAN may be manually and/or automatically detected by the mobile computing device 100, for example. The mobile computing device 100 may be arranged to periodically or continuously check for the presence of an available WLAN. In some cases, the mobile computing device 100 may be arranged to automatically connect to an available and/or preferred WLAN, such as a home or office WLAN associated with a user. In other cases, the user may be required to authorize a connection to an available WLAN. If the WLAN is a secure network, the mobile computing device 100 may prompt the user for and/or supply the appropriate key or password needed to establish a connection to the WLAN.

The logic flow 200 may comprise disabling WWAN data communication whenever an available WLAN is detected (block 204). In various embodiments, WWAN data communication (e.g., EV-DO data communication) may be disabled by the mobile computing device 100 whenever WLAN data communication (e.g., WiFi data communication) is possible over an available WLAN. Disabling WWAN data communication may reduce RF interference and/or power consumption.

In various implementations, disabling WWAN communication may comprise turning off power to the WWAN transceiver or components 126-b of the mobile computing device 100 whenever an available WLAN is detected. Disabling WWAN communication also may comprise suspending the monitoring for incoming WWAN data calls when WLAN data communication is being carried out and/or when the mobile computing device 100 is in an idle state. Disabling WWAN communication may comprise modifying a sleep cycle of the mobile computing device 100 with respect to WWAN data calls to prevent the mobile computing device 100 from periodically waking up when in an idle state.

Upon detecting an available WLAN, the mobile computing device 100 may be arranged to handoff or switch communications from the cellular voice channel 130 and/or the WWAN communication channel 132 to the WLAN data channel 134. For example, when an available WLAN is detected, the mobile computing device 100 may be arranged to handoff or switch a voice call on the cellular voice channel 130 to a Voice over IP (VOIP) call on the WLAN data channel 134. The channel control module 136 also may be arranged to handoff or switch a data call on the WWAN data channel 132 to the WLAN data channel 134.

The logic flow 200 may comprise monitoring WLAN data communication capability (block 206). In various embodiments, the mobile computing device 100 may be arranged to continuously or periodically monitor WLAN communication capability to determine whether WLAN data communication is possible and/or is being carried out above a certain threshold level (e.g., signal strength).

The logic flow 200 may comprise enabling WWAN communication (block 208). In various embodiments, the mobile computing device 100 may enable and/or reestablish WWAN data communication if WLAN communication is unavailable, lost, and/or deteriorates below a certain threshold level (e.g., signal strength). For example, the mobile computing device 100 may be arranged to monitor WiFi communication and establish or reestablish EV-DO data communication if WiFi communication is lost and/or if the signal strength falls below a certain threshold level. The mobile computing device 100 may be arranged to handoff or switch communication from WLAN data communication to WWAN data communication.

In various implementations, the mobile computing device 100 may be arranged to monitor for incoming WWAN data calls whenever and/or only if an available WLAN is not detected. For example, while data communication over the WLAN channel is being carried out, the mobile computing device 100 will not monitor for incoming WWAN data calls. Additionally, whenever an available WLAN is detected and WLAN data communication is possible, the mobile computing device 100 will not monitor for incoming WWAN calls either continuously or periodically according to a sleep cycle when in an idle state.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a mobile computing device to support cellular voice communication, wireless wide area network (WWAN) data communication, and wireless local area network (WLAN) data communication, the mobile computing device comprising a channel control module to disable WWAN data communication whenever the mobile computing device is communicably connected to an available WLAN, wherein the channel control module disables the WWAN data communication by preventing the mobile computing device from periodically waking up and checking for WWAN data calls when in an idle state.

2. The apparatus of claim 1, wherein the channel control module prevents the mobile computing device from periodically waking up and checking for WWAN data calls when in the idle state by modifying a sleep cycle of the mobile computing device.

3. The apparatus of claim 1, the channel control module to monitor WLAN communication and to enable WWAN data communication if WLAN communication is lost or falls below a certain signal strength threshold level.

4. The apparatus of claim 1, the mobile computing device to monitor for incoming WWAN data calls when the mobile computing device is not communicably connected to an available WLAN.

5. The apparatus of claim 1, the channel control module to handoff communications among a cellular voice channel, a WWAN communication channel, and a WLAN data channel.

6. The apparatus of claim 5, the channel control module to handoff a voice call on the cellular voice channel to the WLAN data channel as a Voice over IP (VOIP) call.

7. The apparatus of claim 1, the mobile computing device to support Code Division Multiple Access (CDMA) cellular voice communication, Evolution-Data Optimized (EV-DO) data communication, and Wireless Fidelity (WiFi) communication.

8. The apparatus of claim 5, the WLAN comprising a secure WLAN, the channel control module to supply a key or password to establish a connection with said secure WLAN.

9. A method comprising:
detecting an available wireless local area network (WLAN); and
disabling wireless wide area network (WWAN) data communication capability of a mobile computing device whenever the mobile computing device is communicably connected to an available WLAN, the disabling comprising:
preventing the mobile computing device from periodically waking up and checking for incoming WWAN data calls when the mobile computing device is in an idle state.

10. The method of claim 9, comprising monitoring WLAN communication and enabling WWAN data communication if WLAN communication is lost or falls below a certain signal strength threshold level.

11. The method of claim 9, comprising monitoring for incoming WWAN data calls when the mobile computing device is not communicably connected to an available WLAN.

12. The method of claim 9, comprising performing a handoff to or from a WLAN data channel.

13. The method of claim 9, wherein preventing the mobile computing device from periodically waking up and checking for incoming WWAN data calls when the mobile computing device is in an idle state comprises modifying a sleep cycle of said mobile computing device.

14. A non-transitory computer-readable storage medium comprising instructions that if executed enable a computing system to:
detect an available wireless local area network (WLAN); and
disable wireless wide area network (WWAN) data communication capability of a mobile computing device whenever the mobile computing device is communicably connected to an available WLAN by enabling the computing system to:
prevent said mobile computing device from periodically waking up and checking for incoming WWAN data calls when said mobile computing device is in an idle state.

15. The non-transitory computer-readable storage medium of claim 14, further comprising instructions that if executed enable a computing system to monitor WLAN communication and enable WWAN data communication if WLAN communication is lost or falls below a certain signal strength threshold level.

16. The non-transitory computer-readable storage medium of claim 14, further comprising instructions that if executed enable a computing system to monitor for incoming WWAN data calls when the mobile computing device is not communicably connected to an available WLAN.

17. The non-transitory computer-readable storage medium of claim 14, further comprising instructions that if executed enable a computing system to perform a handoff to or from a WLAN data channel.

18. The non-transitory computer-readable storage medium of claim 14, wherein said instructions to enable said computing system to prevent said mobile computing device from periodically waking up and checking for incoming WWAN data calls when said mobile computing device is in an idle state comprises instructions that if executed enable the computing system to modify a sleep cycle of said mobile computing device.

19. An apparatus having a processor and a memory, the apparatus comprising:
   means for detecting an available wireless local area network (WLAN); and
   means for disabling wireless wide area network (WWAN) data communication capability of a mobile computing device whenever the mobile computing device is communicably connected to an available WLAN, the means for disabling including:
      means for preventing the mobile computing device from periodically waking up and checking for incoming WWAN data calls when the mobile computing device is in an idle state.

20. The apparatus of claim 19, wherein the means for preventing the mobile computing device from periodically waking UP and checking for incoming WWAN data calls when the mobile computing device is in the idle state comprises means for modifying a sleep cycle of the mobile computing device.

\* \* \* \* \*